(No Model.)
A. N. PARRY & H. E. MORRILL.
SHIFTING SEAT.
No. 462,101. Patented Oct. 27, 1891.
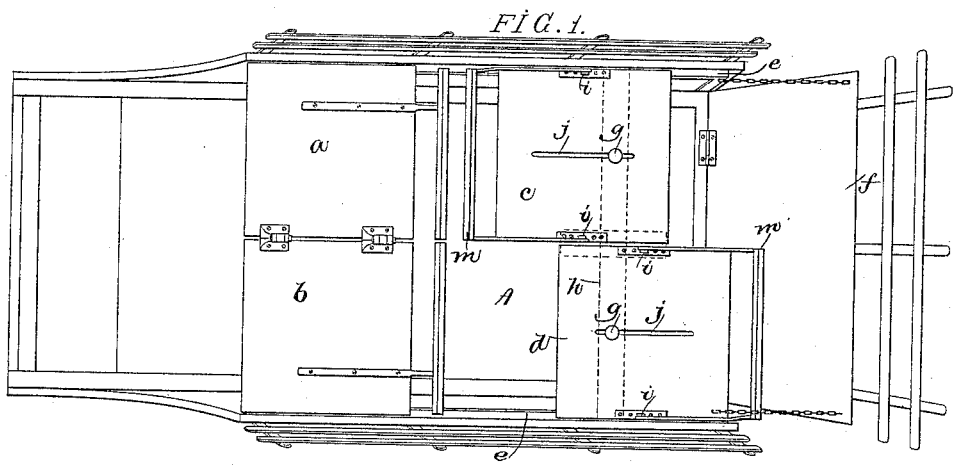
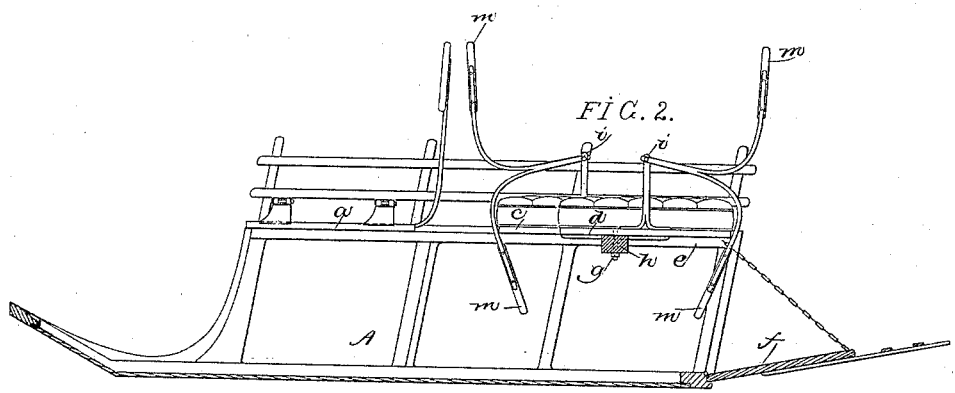

United States Patent Office.

AUGUSTUS N. PARRY AND HORACE E. MORRILL, OF AMESBURY, MASSACHUSETTS.

SHIFTING SEAT.

SPECIFICATION forming part of Letters Patent No. 462,101, dated October 27, 1891.

Application filed July 25, 1891. Serial No. 400,681. (No model.)

*To all whom it may concern:*

Be it known that we, AUGUSTUS N. PARRY and HORACE E. MORRILL, of Amesbury, in the county of Essex and State of Massachusetts, have invented a new and useful Improvement in Carriages, which will, in connection with the accompanying drawings, be hereinafter fully described, and specifically defined in the appended claims.

In said drawings, Figure 1 is a top plan view of a carriage body and seats embodying our invention, and Fig. 2 is a vertical longitudinal section of Fig. 1.

The object of our invention is to produce a two-seated vehicle wherein the halves of the divided rear seat may be so adjusted that both occupants may face either to front or rear, as preferred, or one occupant may face to front and the other to rear, if desired; and it consists in providing each half of the seat with means whereby it may at will be moved a limited distance to front or rear, according as it is desired to have it face, and in providing each half with a duplex or reversible back, whereby the seat may be provided with a back at either its front or rear edge, according to whichever way the occupants are to face.

Referring again to said drawings, A represents the body, which may be of any desired style. The front seat is shown at $a$ $b$ as subdivided and hinged, so that either half may be turned up in a well-known manner to allow access or egress from the rear seat. The halves of the subdivided rear seat are shown at $c$ $d$ as resting on side ledges $e$ $e$ and transverse bar $h$, to which latter said parts of the seat are secured by bolts $g$, which pass through slots $j$ and are secured beneath said bar by a screw-nut, as shown in Fig. 2, the broad head of the bolt resting upon the top surface of the seat. The duplex backs $m$ $m$ of each half of the rear seat are pivoted at $i$ to standards secured to said halves at each end thereof, so as to be reversed as the seats face forward or to rear.

In use, when the occupants of both halves $c$ $d$ are to face forward, tail-board $f$ is raised and closed and both halves are arranged in the position shown by part $d$; but when both occupants are to face to rear the tail-board is opened and both halves are arranged as shown by part $c$, while if one occupant is to face to front and the other to rear either half will be arranged as shown at $c$ and the other half as shown at $d$.

We claim as our invention—

1. In a two-seated vehicle, a rear seat divided in the longitudinal line of the body and with each half constructed and arranged to be adjusted forward or backward a limited distance, whereby they may be rendered forward or rearward facing seats, and a pivoted tail-board arranged to serve as a foot-board for rearward-facing occupants of said seats, substantially as specified.

2. In a two-seated vehicle, the combination, with a front seat, of the rear seat divided into parts $c$ $d$ and formed with slots $j$ and secured by bolts $g$, and a tail-board $f$, arranged to be opened and closed and to serve as a foot-board when opened, substantially as specified.

AUGUSTUS N. PARRY.
HORACE E. MORRILL.

Witnesses:
GEORGE H. BRIGGS,
DELL W. DOLBIER.